US012592483B2

(12) United States Patent
Jung et al.

(10) Patent No.: US 12,592,483 B2
(45) Date of Patent: Mar. 31, 2026

(54) SHIELD CAN HAVING ANTENNA FUNCTION AND ELECTRONIC MODULE COMPRISING SAME

(71) Applicant: AMOTECH CO., LTD., Incheon (KR)

(72) Inventors: Hongdae Jung, Incheon (KR); Yunsik Seo, Incheon (KR); Hyungil Baek, Incheon (KR); Jaemin Kim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 124 days.

(21) Appl. No.: 18/686,775

(22) PCT Filed: Aug. 22, 2022

(86) PCT No.: PCT/KR2022/012480
§ 371 (c)(1),
(2) Date: Feb. 26, 2024

(87) PCT Pub. No.: WO2023/027442
PCT Pub. Date: Mar. 2, 2023

(65) Prior Publication Data

US 2024/0356212 A1 Oct. 24, 2024

(30) Foreign Application Priority Data

Aug. 27, 2021 (KR) ........................ 10-2021-0113973

(51) Int. Cl.
*H01Q 1/52* (2006.01)
*H01Q 1/38* (2006.01)

(52) U.S. Cl.
CPC ............... *H01Q 1/526* (2013.01); *H01Q 1/38* (2013.01)

(58) Field of Classification Search
CPC ............. H01Q 1/526; H01Q 1/38; H01Q 1/52
See application file for complete search history.

(56) References Cited

U.S. PATENT DOCUMENTS 6,867,746 B2 3/2005 Mendolia et al.
9,343,806 B2 * 5/2016 Desclos ................. H01Q 13/10
10,862,201 B2 * 12/2020 Sato ......................... H01Q 1/38
(Continued)

FOREIGN PATENT DOCUMENTS

EP 1826867 A1 * 8/2007 ............. H01Q 12/43
JP 2007-259412 A 10/2007
JP 2008131489 A * 6/2008
(Continued)

OTHER PUBLICATIONS

KR Office Action dated Nov. 21, 2023 as received in Application No. 10-2021-0113973.

*Primary Examiner* — Seung H Lee
(74) *Attorney, Agent, or Firm* — Maschoff Brennan

(57) ABSTRACT

Disclosed is a shield can which operates as an antenna for location determination while blocking electromagnetic waves by defining a shielding area and radiation areas which resonate in one or more frequency bands by forming a shielding pattern and a radiation pattern, and an electronic module comprising same. Here, the shield can comprises: a carrier, a shielding pattern plated on a portion of the surface of the carrier to form the shielding area; and a radiation pattern plated on a different portion of the surface of the carrier to form a plurality of radiation areas.

14 Claims, 8 Drawing Sheets

(56) References Cited

U.S. PATENT DOCUMENTS

2018/0219588 A1* 8/2018 Bae .................... H04L 25/4902

FOREIGN PATENT DOCUMENTS

| | | | |
|---|---|---|---|
| KR | 10-2011-0019083 | A | 2/2011 |
| KR | 10-1077452 | B1 | 10/2011 |
| KR | 10-2012-0043503 | A | 5/2012 |
| KR | 10-2019-0072024 | A | 6/2019 |
| KR | 10-2013234 | B1 | 8/2019 |

* cited by examiner

[FIG. 1]
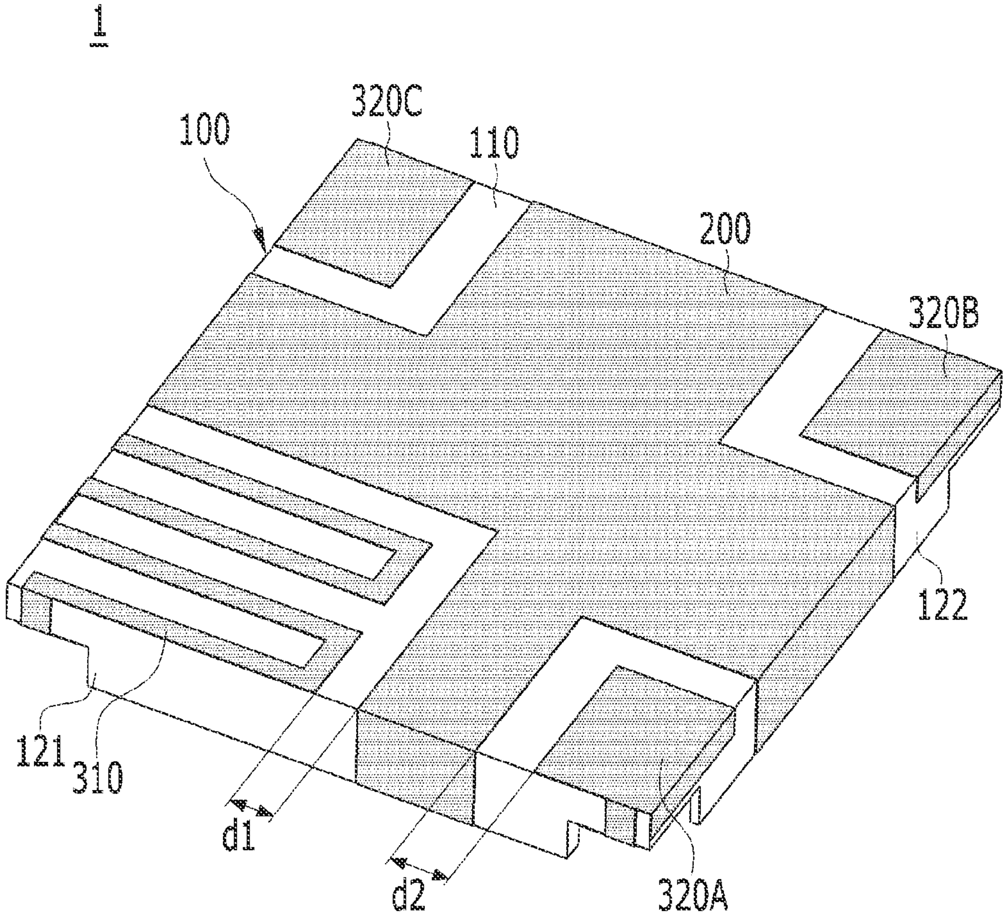

[FIG. 2]
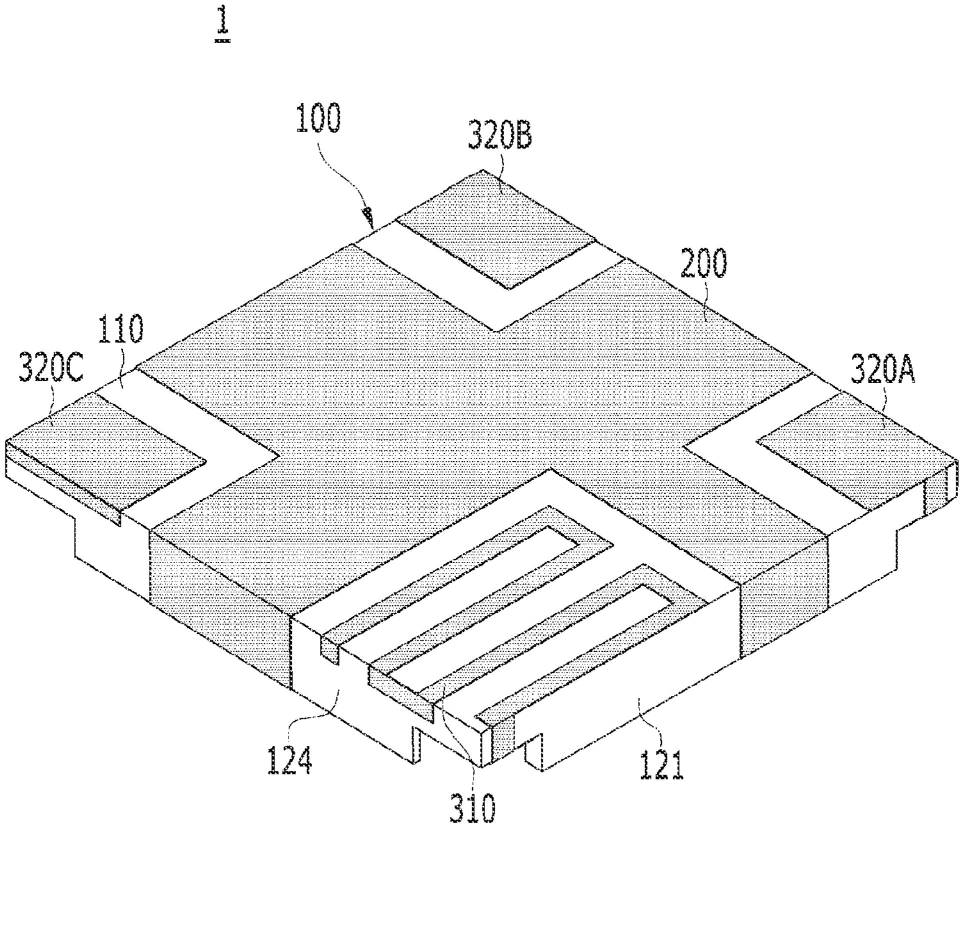

[FIG. 3]
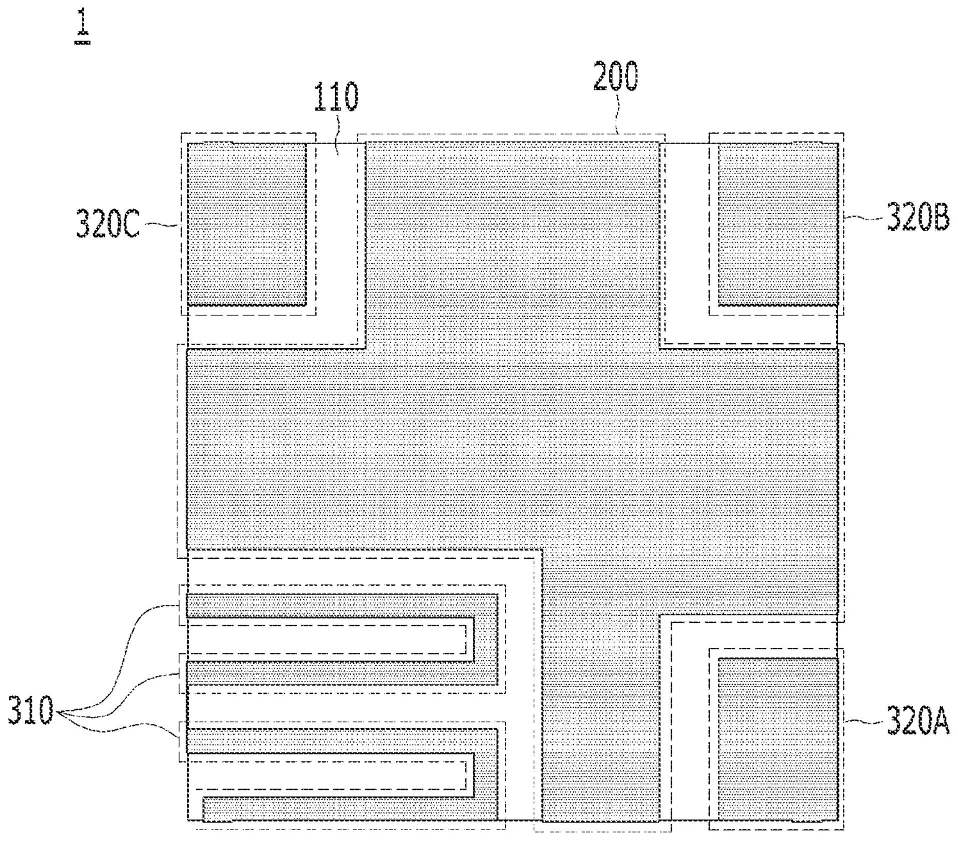

[FIG. 4]
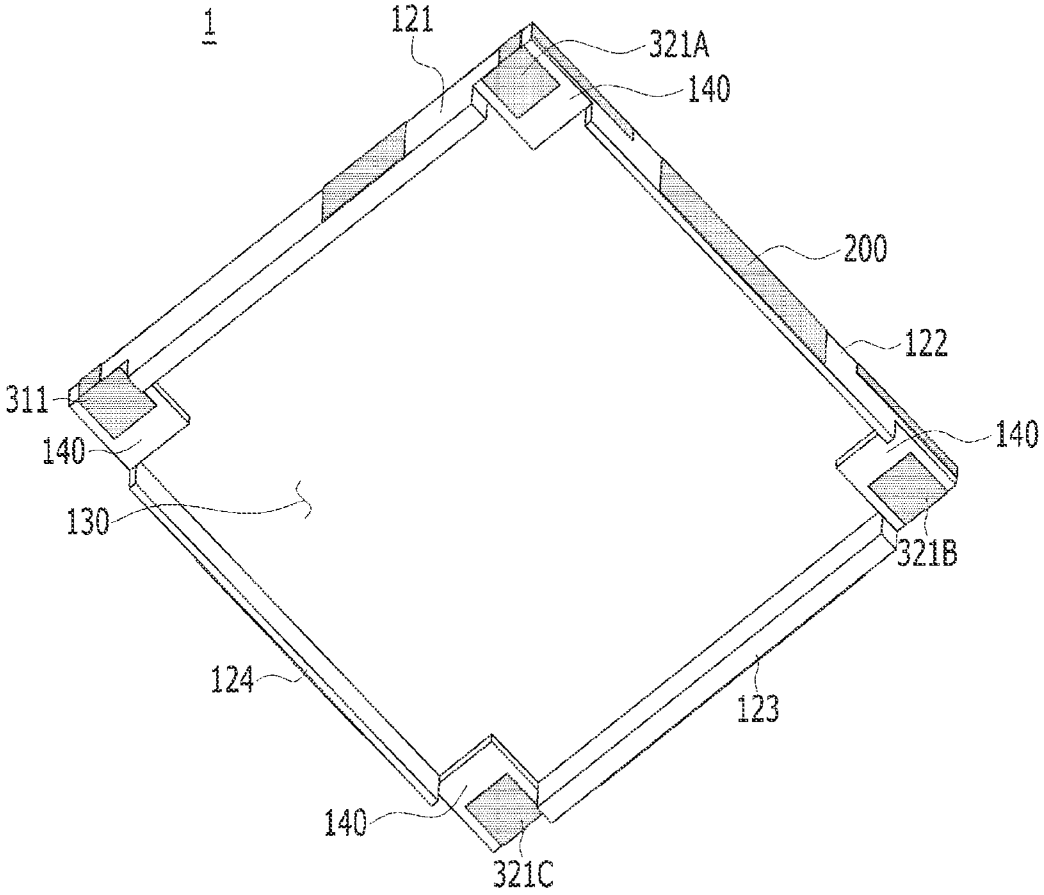

[FIG. 5]
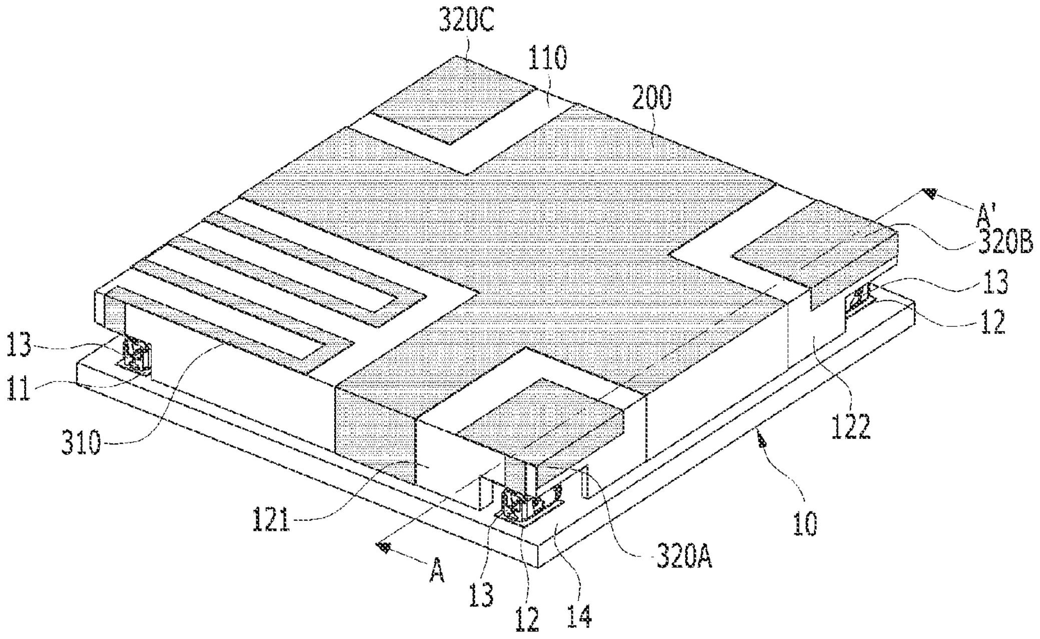

[FIG. 6]
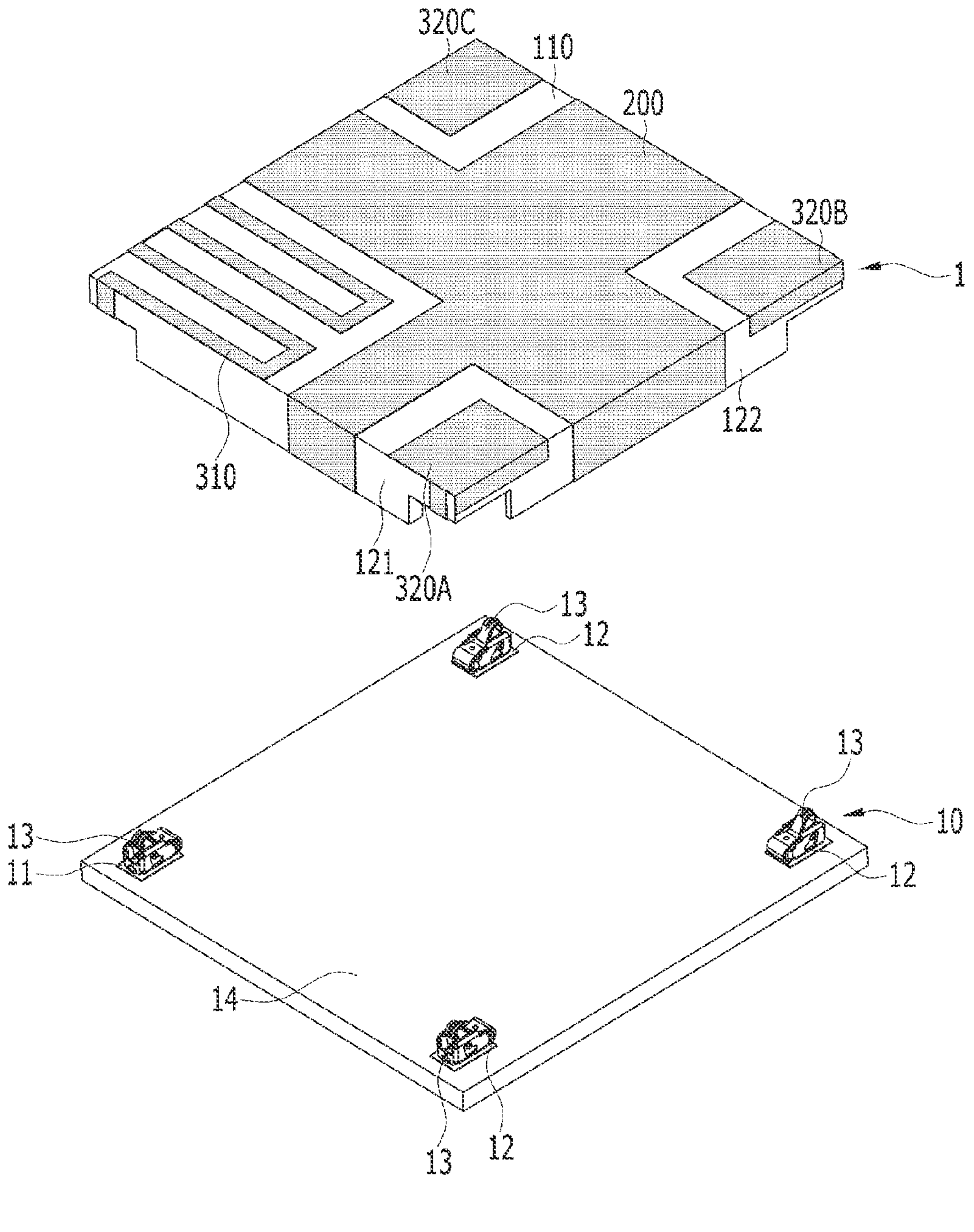

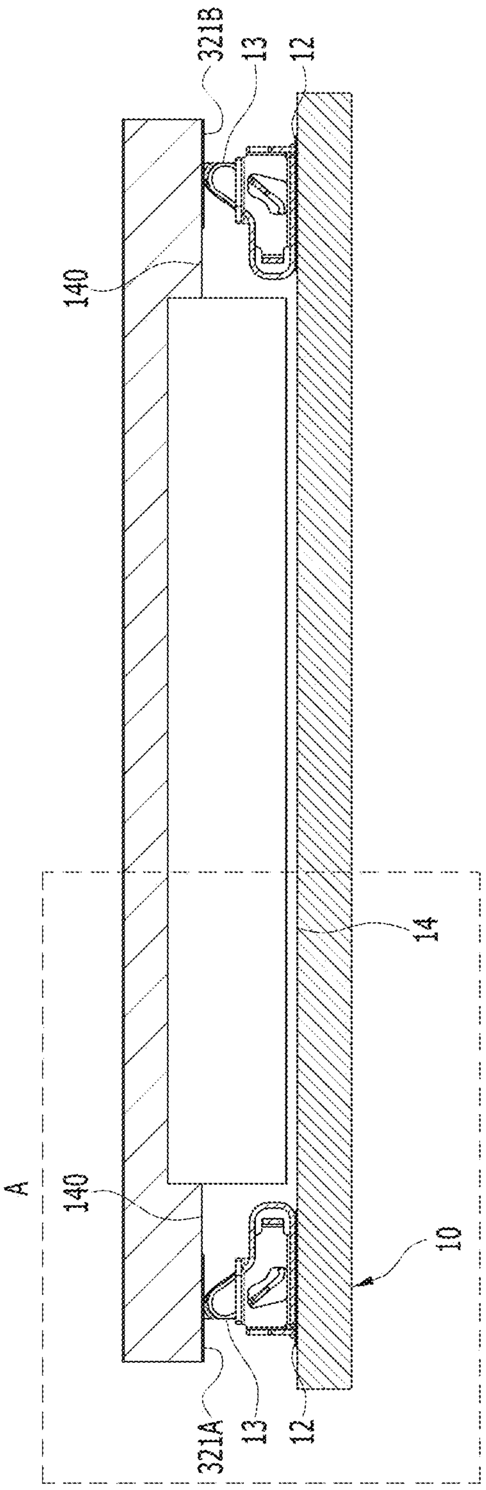
[FIG. 7]

[FIG. 8]
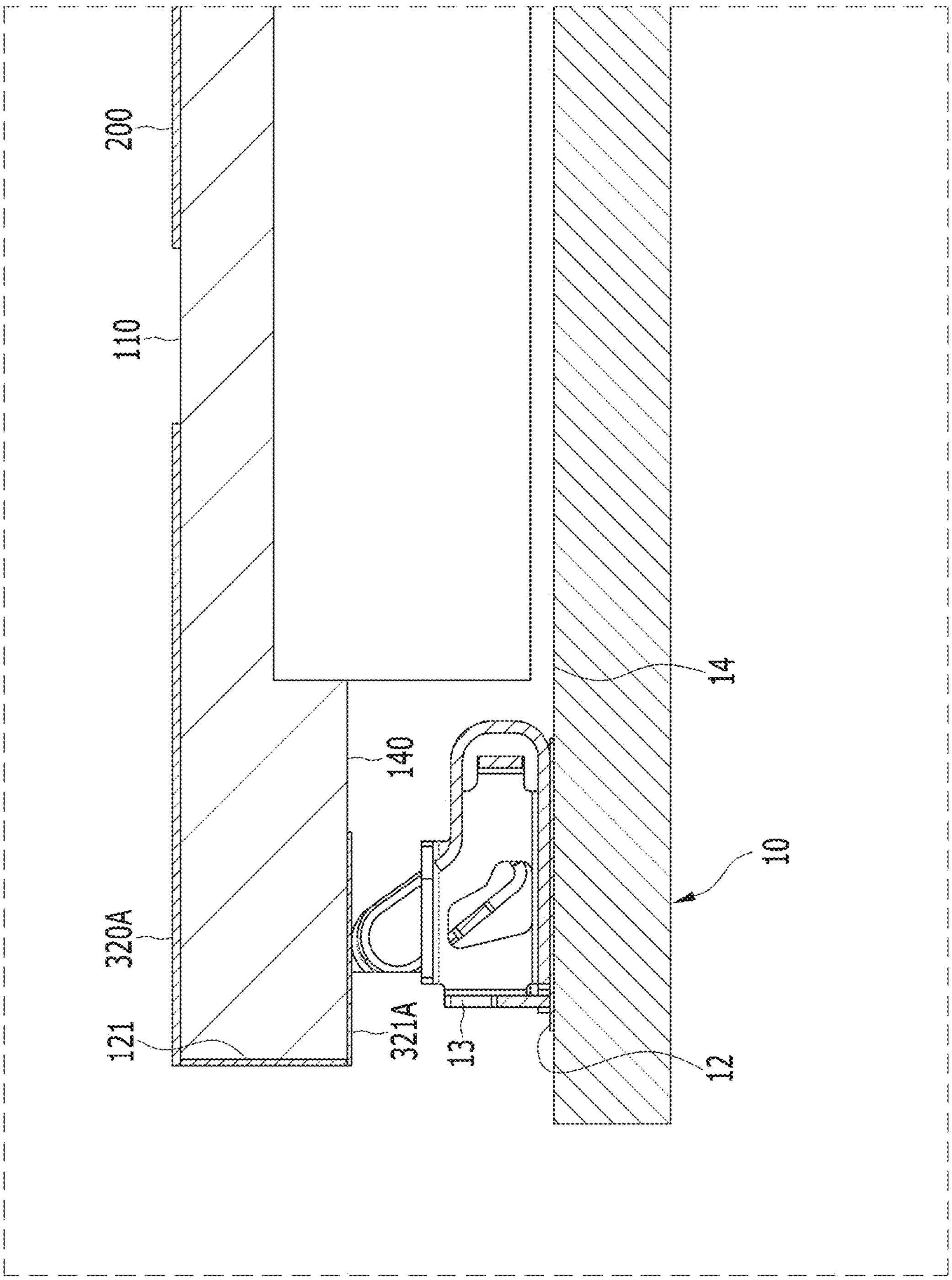

SHIELD CAN HAVING ANTENNA FUNCTION AND ELECTRONIC MODULE COMPRISING SAME

TECHNICAL FIELD

The present disclosure relates to a shield can mounted on an electronic device to shield electromagnetic waves to block noises and an electronic module including the same.

BACKGROUND ART

Recently, as electronic devices have become more complex and have advanced specifications, the number of antennas mounted (or installed) is increasing. For example, recent smartphones are equipped with an antenna for transmitting and receiving signals in mobile communication frequency bands, an antenna for short-range communication such as Bluetooth and near-field communication (NFC), a global positioning system (GPS) antenna and an ultra-wideband (UWB) antenna for transmitting and receiving position information, and the like.

However, as an electronic device is gradually becoming slimmer and smaller, there is a problem in that a space for mounting electronic components and antennas is insufficient, and due to a reduction of the mounting space, interference occurs between the electronic components and the antennas mounted on the electronic device, there degrading the performance of the antennas.

Therefore, a shield can for shielding electromagnetic waves is mounted on the electronic device, and there is a problem in that as the shield can is additionally disposed, the mounting space becomes more insufficient, and a layout structure and circuits of the electronic components become complicated.

SUMMARY OF INVENTION

Technical Problem

The present disclosure has been proposed to solve the problems and is directed to providing a shield can which operates as an antenna for location determination while shielding electronic waves by defining a shielding area and a radiation area which resonates in one or more frequency bands by forming a shielding pattern and a radiation pattern, and an electronic module including the same.

Solution to Problem

To achieve the object, a shield can disposed on a printed circuit board and configured to cover electronic components mounted on the printed circuit board according to an embodiment of the present disclosure may include a carrier having an open lower surface and formed with an accommodating space accommodating the electronic components, a shielding pattern plated on a portion of a surface of the carrier to form a shielding area, and radiation patterns plated on the other portions of the surface of the carrier to form a plurality of radiation areas, wherein each of the radiation patterns and the shielding pattern may be disposed at distances.

The carrier may include a plurality of side surfaces extending downward from an edge of an upper surface thereof, and a plurality of stepped surfaces formed by opening some edge portions at which the plurality of side surfaces meet.

Each of the radiation patterns may be formed consecutively along the upper surface, any one of the plurality of side surfaces, and the stepped surface of the carrier. Here, each of the plurality of radiation patterns may be formed to extend to another side surface of the plurality of side surfaces. In this case, two side surfaces connected to the radiation pattern may be perpendicular to each other.

The radiation patterns may be disposed in a perimetric direction of the carrier at distances. In addition, the radiation patterns may be disposed adjacent to four corners of the carrier.

The radiation pattern may have one of a meander line shape and patch shape.

A first radiation pattern, which is any one of the radiation patterns, may be formed in a meander line shape to resonate in a first frequency band, and a plurality of second radiation patterns except for the first radiation pattern among the radiation patterns may be formed in a patch shape to resonate in a second frequency band which differs from the first frequency band.

Two adjacent radiation patterns among the plurality of second radiation patterns may be disposed symmetrically on the upper surface of the carrier.

The first radiation pattern may resonate in the first frequency band to operate as a Bluetooth low energy (BLE) antenna, and the plurality of second radiation patterns may resonate in the second frequency band to operate as an ultra-wideband (UWB) antenna.

The radiation pattern may be formed on the surface of the carrier by a laser direct structuring (LDS) processing method.

In addition, the present disclosure may provide an electronic module including the shield can. Specifically, an electronic module may include a printed circuit board, and a shield can installed on the printed circuit board to cover electronic components mounted on the printed circuit board, wherein the shield can may include a carrier having an open lower surface and formed with an accommodating space accommodating the electronic components, a shielding pattern plated on a portion of a surface of the carrier to form a shielding area, and radiation patterns plated on the other portions of the surface of the carrier to form a plurality of radiation areas, and each of the radiation patterns and the shielding pattern are disposed at distances.

Here, the carrier may include a plurality of side surfaces extending downward from an edge of an upper surface thereof, and a plurality of stepped surfaces formed by opening some edge portions at which the plurality of side surfaces meet. In addition, each of the radiation patterns may be formed consecutively along the upper surface, any one of the plurality of side surfaces, and the stepped surface of the carrier.

In addition, the printed circuit board may include a plurality of feeding pads provided on an upper surface thereof, and an electrical connection means mounted on each of the plurality of feeding pads, and each of feeding areas located on the stepped surface of the radiation patterns may be electrically connected to each of the feeding pad through the electrical connection means.

Advantageous Effects of Invention

According to the present disclosure, the shield can and the electronic module including the same can operate as the antenna by forming the radiation patterns on the surface of the carrier by the LDS processing method to form the metal radiation area.

In addition, in the present disclosure, since the portion formed to extend to the side surface is included, it is possible to secure the distance with the shielding pattern to a set distance or more and reduce the size of the radiation pattern in the width direction by the portion formed to extend to the side surface, thereby minimizing the size of the antenna in package (AiP).

In addition, in the present disclosure, since the plurality of radiation patterns disposed to be spaced apart from each other operate as the antenna for location determination, it is possible to perform the location determination with high accuracy and optimize the performance of the location determination.

In addition, in the present disclosure, since the shield can operates as the antenna and thus there is no need to install the separate antenna on the electronic device, it is possible to secure the mounting space as compared to the conventional electronic device on which the antenna and the shield can are mounted.

In addition, in the present disclosure, since the additional antenna is not required, it is possible to save the unit price of the electronic device and manufacture the small-sized electronic device, thereby making the electronic device slim and compact as compared to the conventional electronic device on which the antenna and the shield can are mounted.

BRIEF DESCRIPTION OF DRAWINGS

FIG. 1 is a perspective view for describing a shield can according to an embodiment of the present disclosure.

FIG. 2 is a perspective view of the shield can of FIG. 1 viewed in another direction.

FIG. 3 is a plan view for describing the shield can according to the embodiment of the present disclosure.

FIG. 4 is a bottom perspective view for describing the shield can according to the embodiment of the present disclosure.

FIG. 5 is a perspective view for describing an electronic module including the shield can according to the embodiment of the present disclosure.

FIG. 6 is an exploded perspective view of FIG. 5.

FIG. 7 is a cross-sectional view along line A-A' in FIG. 5.

FIG. 8 is an enlarged view of portion A in FIG. 7.

DESCRIPTION OF EMBODIMENTS

Hereinafter, the most preferred embodiment of the present disclosure will be described with reference to the accompanying drawings in order to describe the present disclosure in detail to the extent that those skilled in the art can easily carry out the technical spirit of the present disclosure. First, in adding reference numerals to components in each drawing, it should be noted that the same components have the same reference numerals as much as possible even when they are shown in different drawings. In addition, in describing embodiments of the present disclosure, when it is determined that the detailed description of related known configurations or functions may obscure the gist of the present disclosure, a detailed description thereof will be omitted.

Referring to FIGS. 1 to 4, a shield can 1 according to an embodiment of the present disclosure is configured in the form of covering electronic components (not illustrated) mounted on a circuit board 10 (see FIG. 5) from an upper portion of the circuit board 10. The shield can 1 may include a carrier 100, a shielding pattern 200 plated on a portion of a surface of the carrier to form a shielding area for electromagnetic wave shielding, and radiation patterns 310, 320A, 320B, and 320C plated on the surface of the carrier 100 except for the shielding area to form a plurality of radiation areas. The shield can 1 may be manufactured by a laser direct structuring (LDS) processing method of processing the surface of the carrier 100 using a laser and then forming the shielding pattern 200 and the radiation patterns 310, 320A, 320B, and 320C through a plating process. A conductive material plated on the surface of the carrier 100 may be copper, nickel, or the like, but is not limited thereto.

A lower surface of the carrier 100 may be open to form an accommodating space 130 (see FIG. 4) for accommodating electronic components. The carrier 100 according to the embodiment of the present disclosure may have, for example, a rectangular parallelepiped shape with an open lower surface, and in this case, the carrier 100 may include an upper surface 110, four side surfaces 121, 122, 123, and 124 extending downward from an edge of the upper surface 110, and four stepped surfaces 140 formed by opening some edge portions at which the side surfaces 121, 122, 123, and 124 meet.

The carrier 100 may be made of an LDS resin material to form the shielding pattern 200 and the radiation patterns 310, 320A, 320B, and 320C by the LDS processing method. For example, the carrier 100 may be made of a synthetic resin material such as polyester resin, polycarbonate (PC), polyethylene terephthalate (PET), or polypropylene (PP), but is not limited thereto.

The shielding pattern 200 may be electrolytically or electrolessly plated on the surface of the carrier 100 to form a portion of the surface of the carrier 100 as a shielding area. In this case, the shielding pattern 200 may be formed on the upper surface 110, the first side surface 121, the second side surface 122, the third side surface 123, and the fourth side surface 124 of the carrier 100. The shielding pattern 200 may be formed in a substantially cross (+) shape, and the radiation patterns 310, 320A, 320B, and 320C may be disposed in four areas partitioned by the shielding pattern 200.

The radiation patterns 310, 320A, 320B, and 320C may be plated on the surface of the carrier 100 to form areas other than the shielding area as the plurality of radiation areas. The radiation patterns 310, 320A, 320B, and 320C may be formed in various shapes and formed in a meander line shape, a patch (plate shape) shape, or the like depending on a frequency band in which the radiation patterns 310, 320A, 320B, and 320C resonate.

The shield can 1 according to the embodiment of the present disclosure includes, for example, the carrier 100 provided with the four radiation patterns 310, 320A, 320B, and 320C, but is not limited thereto, and the number of radiation patterns may be changed variously.

The first radiation pattern 310, which is any one of the radiation patterns 310, 320A, 320B, and 320C, may be formed on three consecutive surfaces of the carrier 100 to operate as a radiator which resonates with a signal in a first frequency band. The first radiation pattern 310 may be consecutively formed along the upper surface 110, any one of the plurality of side surfaces 121, 122, 123, and 124, and the stepped surface 140 of the carrier 100. As will be described below, an area located on the stepped surface 140 of the first radiation pattern 310 is a first feeding area 311 in contact with an electrical connection means 13 (see FIG. 5) of the circuit board 10.

The first radiation pattern 310 may be formed in a meander line shape with a predetermined line width. In this case, for example, the first radiation pattern 310 operates as a Bluetooth low energy (BLE) antenna which is formed in a meander line shape with one or more bent portions to resonate with the signal in the first frequency band and is formed in a meander line shape with seven bent portions to resonate with a signal in a BLE frequency band. Here, since a line width, area, and the like of the first radiation pattern 310 may be variously changed depending on the electronic components to be accommodated, the resonant frequency band, or the like, the values are not limited.

Meanwhile, when the first radiation pattern 310 and the shielding pattern 200 are disposed adjacent to each other, signal interference occurs, and thus the antenna performance of the first radiation pattern 310 is inevitably degraded. Therefore, the first radiation pattern 310 is disposed to be spaced by a set distance or more from the shielding pattern 200. A distance d1 (see FIG. 1) between the first radiation pattern 310 and the shielding pattern 200 is, for example, about 1 mm or more.

The first radiation pattern 310 may be formed to extend to another one of the plurality of side surfaces 121, 122, 123, and 124. For example, as illustrated in FIGS. 2 and 4, the first radiation pattern 310 may be formed consecutively along the upper surface 110, the first side surface 121, and the stepped surface 140 and may include a portion formed to extend to the fourth side surface 124. Here, the two side surfaces to which the first radiation pattern 310 is connected, that is, the first side surface 121 and the fourth side surface 124 may be perpendicular to each other.

As described above, since the first radiation pattern 310 includes the portion extending to the side surface, a size of the first radiation pattern 310 in a width direction may be reduced by the portion formed to extend to the side surface. In other words, the shield can 1 according to the embodiment of the present disclosure can secure a distance between the first radiation pattern 310 and the shielding pattern 200 to be a set distance or more and reduce the size of the first radiation pattern 310 in the width direction by the portion formed to extend to the side surface. In other words, it is possible to minimize a size of an antenna in package (AiP).

The plurality of second radiation patterns 320A, 320B, and 320C except for the first radiation pattern 310 among the radiation patterns 310, 320A, 320B, and 320C may be formed on three consecutive surfaces of the carrier 100 to operate as a radiator which resonates with a signal in a second frequency band. The second radiation pattern 320A, 320B, and 320C may be formed consecutively along the upper surface 110, any one of the plurality of side surfaces 121, 122, 123, and 124, and the stepped surface 140 of the carrier 100. Here, areas located on the stepped surface 140 of the second radiation patterns 320A, 320B, and 320C are second feeding areas 321A, 321B, and 321C in contact with the electrical connection means 13 of the circuit board 10.

The second radiation patterns 320A, 320B, and 320C are formed in a patch shape (plate shape) with a predetermined line width. In this case, for example, the second radiation patterns 320A, 320B, and 320C operate as an ultra-wideband (UWB) antenna which is formed of a quadrangular patch with a predetermined area to resonate with the signal in the second frequency band, which differs from the first frequency band, that is, a UWB frequency band. Here, since areas, shapes, and the like of the second radiation pattern 320A, 320B, and 320C may be variously changed depending on the electronic components to be accommodated, the resonant frequency band, or the like, the values are not limited.

Meanwhile, when each of the second radiation patterns 320A, 320B, and 320C and the shielding pattern 200 are disposed adjacent to each other, signal interference occurs and thus the antenna performance of each of the second radiation patterns 320A, 320B, and 320C is inevitably degraded. Therefore, each of the second radiation patterns 320A, 320B, and 320C is disposed to be spaced by a set distance or more from the shielding pattern 200. Here, a distance d2 (see FIG. 2) between each of the second radiation patterns 320A, 320B, and 320C and the shielding pattern 200 is, for example, about 1 mm or more.

Each of the second radiation patterns 320A, 320B, and 320C may be formed to extend to another one of the plurality of side surfaces 121, 122, 123, and 124. For example, as illustrated in FIGS. 1, 2, and 4, the second radiation pattern 320A may be formed consecutively along the upper surface 110, the first side surface 121, and the stepped surface 140 and may include a portion formed to extend to the second side surface 122. Here, the two side surfaces, which are connected to the second radiation pattern 320A, that is, the first side surface 121 and the second side surface 122 may be perpendicular to each other. The same shape can be applied to the remaining second radiation patterns 320B and 320C with only different locations. For example, the second radiation pattern 320B may be formed consecutively along the upper surface 110, the third side surface 123, and the stepped surface 140 and may include a portion formed to extend to the second side surface 122. In addition, the second radiation pattern 320C may be formed consecutively along the upper surface 110, the third side surface 123, and the stepped surface 140 and may include a portion formed to extend to the fourth side surface 124. Meanwhile, although not illustrated, any one of the second radiation patterns 320A, 320B, and 320C may be formed without the portion extending to the side surface if necessary.

As described above, since each of the second radiation patterns 320A, 320B, and 320C includes the portion formed to extend to the side surface, a size of each of the second radiation patterns 320A, 320B, and 320C in a width direction may be reduced by the portion formed to extend to the side surface. In other words, the shield can 1 according to the embodiment of the present disclosure can secure a distance between the each of the second radiation patterns 320A, 320B, and 320C and the shielding pattern 200 to be a set distance or more and reduce the size of each of the second radiation patterns 320A, 320B, and 320C in the width direction by the portion formed to extend to the side surface. In other words, it is possible to minimize the size of the AiP.

The first radiation pattern 310 and the plurality of second radiation patterns 320A, 320B, and 320C may be disposed at distances in a perimetric direction of the carrier 100. As described above, in the shield can 1 according to the embodiment of the present disclosure, the plurality of radiation patterns 310, 320A, 320B, and 320C may operate as a plurality of antennas for location determination.

Examples of the location determination method include time difference of arrival (TDoA) by a radio wave arrival time and trigonometric equation, time of arrival (TOA) calculating the radio wave arrival time, angle of arrival (AOA) using an angle of a transmitted signal, a method using the RSSI, a Wi-Fi positioning technique using a wireless AP, or the like. Among them, in the present disclosure, the AOA location determination method may be used to increase location determination accuracy, and to this end, the plurality of radiation patterns 310, 320A, 320B, and 320C may be provided.

When the plurality of radiation patterns 310, 320A, 320B, and 320C operate as antennas for location determination, the location determination with high accuracy is possible by using an angle, strength, or the like of a signal transmitted to each antenna.

Each of the plurality of radiation patterns 310, 320A, 320B, and 320C may be disposed adjacent to the four corners of the shield can 1 and thus disposed at predetermined distances. As described above, since the plurality of radiation patterns 310, 320A, 320B, and 320C are spaced by a distance which may have a significant difference in the signal angle, signal strength, or the like from each other, it is possible to perform more accurate location determination based on the location determination result using each of the plurality of radiation patterns 310, 320A, 320B, and 320C and optimize the performance of the location determination.

Meanwhile, two adjacent second radiation patterns among the plurality of second radiation patterns 320A, 320B, and 320C may be disposed symmetrically on the upper surface 110 of the carrier 100. In other words, the adjacent second radiation patterns 320A and 320B may be disposed symmetrically on the upper surface 110 of the carrier 100. In addition, the adjacent second radiation patterns 320B and 320C may be disposed symmetrically on the upper surface 110 of the carrier 100.

Meanwhile, in the embodiment of the present disclosure, an example in which the first radiation pattern 310 and the second radiation patterns 320A, 320B, and 320C are formed in the shield can 1 is illustrated and described, but the present disclosure is not limited thereto, and only one of the first radiation pattern 310 and the second radiation patterns 320A, 320B, and 320C may be formed therein. For example, the shield can 1 may be formed with only the second radiation pattern as the radiation pattern.

Meanwhile, as illustrated in FIG. 4, the first feeding area 311 and the second feeding areas 321A, 321B, and 321C are disposed on the stepped surface 140 of the carrier 100.

The first feeding area 311 is an area connected to a first feeding pad 11 of the circuit board 10 for feeding the first radiation pattern 310 and may be in contact with the electrical connection means 13 mounted on the first feeding pad 11 and electrically connected to a first signal processing element (not illustrated) for processing the signal in the first frequency band. The first feeding area 311 is a portion of the first radiation pattern 310 and may be located on the stepped surface 140 near the corner at which the first side surface 121 and the fourth side surface 124 meet.

The second feeding areas 321A, 321B, and 321C are areas connected to a second feeding pad 12 of the circuit board 10 for feeding and may be in contact with the electrical connection means 13 mounted on the second feeding pad 12 and electrically connected to a second signal processing element (not illustrated) for processing the signal in the second frequency band. Each of the second feeding areas 321A, 321B, and 321C is a portion of each of the second radiation patterns 320A, 320B, and 320C. Specifically, the second feeding area 321A located on the stepped surface 140 near the corner at which the first side surface 121 and the second side surface 122 meet is a portion of the second radiation pattern 320A. In addition, the second feeding area 321B located on the stepped surface 140 near the corner at which the second side surface 122 and the third side surface 123 meet is a portion of the second radiation pattern 320B. In addition, the second feeding area 321C located on the stepped surface 140 near the corner at which the third side surface 123 and the fourth side surface 124 meet is a portion of the second radiation pattern 320C.

As described above, the first feeding area 311 and the second feeding areas 321A, 321B, and 321C are areas in contact with the electrical connection means 13 provided on the circuit board 10 when the shield can 1 is mounted on the circuit board 10.

Referring to FIGS. 5 and 6, an electronic module including the shield can 1 may include the circuit board 10 on which the shield can 1 is installed.

Specifically, the circuit board 10 is disposed inside the electronic device, and electronic components are mounted on the upper surface 14 on which the shield can 1 is mounted. In this case, the upper surface 14 of the circuit board 10 may be provided with the first feeding pad 11 and the second feeding pad 12 for feeding the first radiation pattern 310 and the second radiation patterns 320A, 320B, and 320C of the shield can 1.

The first feeding pad 11 may be formed on the upper surface of the circuit board 10 for a surface mount technology (SMT) process. The first feeding pad 11 may be connected to the first signal processing element (not illustrated) for processing the signal in the first frequency band.

The first feeding pad 11 is formed in an area corresponding to the first feed area 311 of the shield can 1 of the upper surface 14 of the circuit board 10. The electrical connection means 13 may be mounted on the first feeding pad 11 using the SMT process. The electrical connection means 13 may have a lower end in contact with the first feeding pad 11 and an upper end in contact with the first feeding area 311. Therefore, the first feeding area 311 located on the stepped surface 140 in the first radiation pattern 310 may be electrically connected to the first feeding pad 11 through the electrical connection means 13. In other words, the first radiation pattern 310 of the shield can 1 may be connected to the first feeding pad 11 through the electrical connection means 13 to receive power and may resonate in the first frequency band to transmit the signal in the first frequency band to the first signal processing element (not illustrated).

Meanwhile, as the electrical connection means 13, not only a C-clip illustrated, but also connection means made of various conductive materials may be used. In addition, although not illustrated, the shield can 1 may be mounted on the circuit board 10 using a conventional coupling method such as a connector.

The second feeding pad 12 may be formed on the upper surface of the circuit board 10 for the SMT process. The second feeding pad 12 may be connected to the second signal processing element (not illustrated) for processing the signal in the second frequency band.

The second feeding pad 12 is provided in areas corresponding to the second feed areas 321A, 321B, and 321C of the shield can 1 of the upper surface 14 of the circuit board 10. The electrical connection means 13 may be mounted on each of the second feeding pad 12 using the SMT process.

Referring to FIGS. 7 and 8, the electrical connection means 13 may have a lower end in contact with the second feeding pad 12 and an upper end in contact with the second feeding areas 321A, 321B, and 321C. Therefore, each of the second feeding areas 321A, 321B, and 321C located on the stepped surface 140 in the second radiation patterns 320A, 320B, and 320C may be electrically connected to each of the second feeding pad 12 through the electrical connection means 13. In other words, the second radiation patterns 320A, 320B, and 320C of the shield can 1 may be connected to the second feeding pad 12 through the electrical connection means 13 to receive power and may resonate in the second frequency band to transmit the signal in the second frequency band to the second signal processing element (not illustrated).

Meanwhile, in the embodiment of the present disclosure, an example in which the shield can 1 is coupled to the circuit board 10 with the size corresponding to the shield can 1, but the present disclosure is not limited thereto, and the shield can 1 may be mounted on the circuit board 10 with various sizes. In addition, the shield can 1 and the circuit board 10 may be mounted on another substrate in a state of being coupled and modularized.

The best embodiments of the present disclosure have been disclosed in the drawings and the specification. Here, although specific terms are used, they are used only for the purpose of describing the present disclosure and are not used to limit the meaning or scope of the present disclosure described in the claims. Therefore, those skilled in the art will understand that various modifications and equivalent embodiments are possible from the present disclosure. Therefore, the true technical scope of the present disclosure should be determined by the technical spirit of the appended claims.

The invention claimed is:

1. A shield can disposed on a printed circuit board and configured to cover electronic components mounted on the printed circuit board, the shield can comprising:

- a carrier having an open lower surface and formed with an accommodating space accommodating the electronic components;
- a shielding pattern plated on a portion of a surface of the carrier to form a shielding area; and
- radiation patterns plated on the other portions of the surface of the carrier to form a plurality of radiation areas,
- wherein each of the radiation patterns and the shielding pattern are disposed at distances, and
- wherein the carrier includes:
- a plurality of side surfaces extending downward from an edge of an upper surface thereof; and
- a plurality of stepped surfaces formed by opening some edge portions at which the plurality of side surfaces meet.

2. The shield can of claim 1, wherein each of the radiation patterns is formed consecutively along the upper surface, any one of the plurality of side surfaces, and the stepped surface of the carrier.

3. The shield can of claim 2, wherein each of the plurality of radiation patterns is formed to extend to another side surface of the plurality of side surfaces.

4. The shield can of claim 3, wherein two side surfaces connected to the radiation pattern are perpendicular to each other.

5. The shield can of claim 1, wherein the radiation patterns are disposed in a perimetric direction of the carrier at distances.

6. The shield can of claim 1, wherein the radiation patterns are disposed adjacent to four corners of the carrier.

7. The shield can of claim 1, wherein the radiation pattern has one of a meander line shape and patch shape.

8. The shield can of claim 1, wherein a first radiation pattern, which is any one of the radiation patterns, is formed in a meander line shape to resonate in a first frequency band, and

- a plurality of second radiation patterns except for the first radiation pattern among the radiation patterns are formed in a patch shape to resonate in a second frequency band which differs from the first frequency band.

9. The shield can of claim 8, wherein two adjacent radiation patterns among the plurality of second radiation patterns are disposed symmetrically on the upper surface of the carrier.

10. The shield can of claim 8, wherein the first radiation pattern resonates in the first frequency band to operate as a Bluetooth low energy (BLE) antenna, and

- the plurality of second radiation patterns resonate in the second frequency band to operate as an ultra-wideband (UWB) antenna.

11. The shield can of claim 1, wherein the radiation pattern is formed on the surface of the carrier by a laser direct structuring (LDS) processing method.

12. An electronic module comprising:

- a printed circuit board; and
- a shield can installed on the printed circuit board to cover electronic components mounted on the printed circuit board,
- wherein the shield can includes:
- a carrier having an open lower surface and formed with an accommodating space accommodating the electronic components;
- a shielding pattern plated on a portion of a surface of the carrier to form a shielding area; and
- radiation patterns plated on the other portions of the surface of the carrier to form a plurality of radiation areas, and
- each of the radiation patterns and the shielding pattern are disposed at distances, and
- wherein the carrier includes:
- a plurality of side surfaces extending downward from an edge of an upper surface thereof; and
- a plurality of stepped surfaces formed by opening some edge portions at which the plurality of side surfaces meet.

13. The electronic module of claim 12, wherein each of the radiation patterns is formed consecutively along the upper surface, any one of the plurality of side surfaces, and the stepped surface of the carrier.

14. The electronic module of claim 13, wherein the printed circuit board includes:

- a plurality of feeding pads provided on an upper surface thereof; and
- an electrical connection means mounted on each of the plurality of feeding pads, and
- each of feeding areas located on the stepped surface of the radiation patterns are electrically connected to each of the feeding pad through the electrical connection means.

* * * * *